(12) United States Patent
Smith et al.

(10) Patent No.: US 10,498,633 B2
(45) Date of Patent: Dec. 3, 2019

(54) TRAFFIC ACTIVITY-BASED SIGNALING TO ADJUST FORWARDING BEHAVIOR OF PACKETS

(71) Applicant: Schweitzer Engineering Laboratories, Inc., Pullman, WA (US)

(72) Inventors: Rhett Smith, Odessa, FL (US); Robert Meine, Boise, ID (US)

(73) Assignee: Schweitzer Engineering Laboratories, Inc., Pullman, WA (US)

(*) Notice: Subject to any disclaimer, the term of this patent is extended or adjusted under 35 U.S.C. 154(b) by 0 days.

(21) Appl. No.: 15/909,347

(22) Filed: Mar. 1, 2018

(65) Prior Publication Data
US 2019/0273677 A1    Sep. 5, 2019

(51) Int. Cl.
| | |
|---|---|
| *H04L 12/707* | (2013.01) |
| *H04L 12/823* | (2013.01) |
| *H04L 12/721* | (2013.01) |
| *H04L 12/26* | (2006.01) |
| *H04L 12/801* | (2013.01) |
| *H04L 12/715* | (2013.01) |

(52) U.S. Cl.
CPC .......... *H04L 45/22* (2013.01); *H04L 43/0894* (2013.01); *H04L 45/38* (2013.01); *H04L 47/32* (2013.01); *H04L 45/64* (2013.01); *H04L 47/12* (2013.01)

(58) Field of Classification Search
CPC ...................................................... H04L 45/22
See application file for complete search history.

(56) References Cited

U.S. PATENT DOCUMENTS

| | | | | |
|---|---|---|---|---|
| 9,094,372 | B2* | 7/2015 | Zuk ..................... | H04L 63/0254 |
| 2007/0242604 | A1* | 10/2007 | Takase ..................... | H04J 3/14 |
| | | | | 370/223 |
| 2013/0329547 | A1* | 12/2013 | Takase ................ | H04L 41/0654 |
| | | | | 370/220 |

(Continued)

OTHER PUBLICATIONS

David Dolezilek, "Taking Full Control of Your Process Bus LAN Using New Ethernet Packet Transport Technologies", International Conference and Exhibition-Relay Protection and Automation for Electric Power Systems, Apr. 25-28, 2017, 10 pages.

(Continued)

*Primary Examiner* — Hassan Kizou
*Assistant Examiner* — Deepa Belur
(74) *Attorney, Agent, or Firm* — Jared L. Cherry (57) ABSTRACT

The present disclosure pertains to systems and methods of monitoring communication devices and communication links in a software defined network (SDN). In one embodiment, a system may include a communications interface configured to receive a plurality of ingress packets. A forwarding subsystem may match a subset of the plurality of ingress packets with the data flow and forwarding the subset of the plurality of ingress packets based on a first instruction set associated with the data flow. A statistical information subsystem may update a meter count associated with the subset of the plurality of ingress packets matched with the data flow. A logic engine configured to determine that the meter count fails to satisfy a threshold, change a port link state based on the failure to satisfy the threshold; and transition from the first instruction set to a second instruction set associated with the flow data.

19 Claims, 6 Drawing Sheets

(56) References Cited

U.S. PATENT DOCUMENTS

| | | | |
|---|---|---|---|
| 2014/0280834 A1* | 9/2014 | Medved | H04L 47/122 |
| | | | 709/223 |
| 2014/0293494 A1 | 10/2014 | Allen | |
| 2016/0274169 A1* | 9/2016 | Cui | G01R 31/025 |
| 2017/0026225 A1 | 1/2017 | Smith | |
| 2017/0026291 A1 | 2/2017 | Smith | |
| 2017/0063660 A1 | 3/2017 | Viquez | |
| 2017/0155573 A1* | 6/2017 | Khemani | H04L 41/0663 |

OTHER PUBLICATIONS

Mark Hadley, David Nicol, and Rhett Smith, "Software-Defined Networking Redefines Performance for Ethernet Control Systems", Sensible Cybersecurity for Power Systems: A Collection of Technical Papers Representing Modern Solutions, 2018, 10 pages.

Diego Kreutz, Fernando M. V. Ramos, Paulo Verissimo, Christian Esteve Rothenberg, Siamak Azodolmolky, and Steve Uhlib, "Software-Defined Networking: A Comprehensive Survey", Proceedings of the IEEE, vol. 103, No. 1, Jan. 2015.

The Opening Network Foundation, "OpenFlow Switch Specification", Mar. 26, 2015, 61 pages.

Eniye Tebekaemi and Duminda Wijesekera, "Designing An IEC 61850 Based Power Distribution Substation Simulation/Emulation Testbed for Cyber-Physical Security Studies", The First International Conference on Cyber-Technologies and Cyber-Systems, 2016, 9 pages.

PCT/US2019/015689 International Search Report and Written Opinion of the International Searching Authority dated Jan. 29, 2019.

* cited by examiner

TRAFFIC ACTIVITY-BASED SIGNALING TO ADJUST FORWARDING BEHAVIOR OF PACKETS

TECHNICAL FIELD

The present disclosure relates to systems and methods for assessing the viability of a communication link in a software defined network ("SDN"). More particularly, but not exclusively, the techniques disclosed in the present application may be configured to analyze data flows and traffic metrics in an SDN to adapt the forwarding behavior of information packets based on such analysis.

BRIEF DESCRIPTION OF THE DRAWINGS

Non-limiting and non-exhaustive embodiments of the disclosure are described, including various embodiments of the disclosure, with reference to the figures, in which.

DETAILED DESCRIPTION

Modern electric power distribution and transmission systems may incorporate a variety of communication technologies that may be used to monitor and protect the system. The communication equipment may be configured and utilized to facilitate an exchange of data among a variety of devices that monitor conditions on the power system and implement control actions to maintain the stability of the power system. The communication networks carry information necessary for the proper assessment of power system conditions and for implementing control actions based on such conditions. In addition, such messages may be subject to time constraints because of the potential for rapid changes in conditions in an electric power distribution and transmission system.

Some electric power transmission and distribution systems may incorporate software defined network ("SDN") networking technologies that utilize a controller to configure and monitor network traffic on the network. SDN networking technologies offer a variety of advantages that may be advantageous in electric power systems, such as deny-by-default security, deterministic transit times, latency control, symmetric transport capabilities, redundancy, fail-over planning, etc.).

SDN networking technologies allow programmatic changes to a network and allow an entire communication network to be managed as a single asset, which may simply the management of the network, and enable continuous monitoring of the network. In an SDN, the control plane, which forwards the traffic, is separated from the data plane, which performs the forwarding of the traffic in the network. In contrast, in conventional networking devices the control plane and the data plane are typically implemented in a single device (i.e., a network router or switch). A conventional networking device may generate an address table or database to process communications.

The control plane may be used to achieve the optimal usage of network resources by creating specific data flows through the communication network. A data flow, as the term is used herein, refers to a set of parameters used to match and take action based on network packet contents. Data flows may permit specific paths based on a variety of criteria that offer significant control and precision to operators of the network. In contrast, in large traditional networks, trying to match a network-discovered path with an application desired data path may be a challenging task involving changing configurations in many devices. To compound this problem, the management interfaces and feature sets used on many devices are not standardized. Still further, network administrators often need to reconfigure the network to avoid loops, gain route convergence speed, and prioritize a certain class of applications.

Significant complexity in managing a traditional network in the context of an electric power transmission and distribution system arises from the fact that each network device (e.g., a switch or router) has control logic and data-forwarding logic integrated together. For example, in a traditional network appliances, dynamic control plane protocols such as Routing Information Protocol (RIP), Open Shortest Path First (OSPF), Spanning Tree Protocol (STP), Address Resolution Protocol (ARP), and the like may be used to determine how a packet should be forwarded. The paths determined by the routing protocol are encoded in address tables, which are then used to forward packets. Similarly, in a Layer 2 device such as a network bridge (or network switch), configuration parameters and/or Spanning Tree Algorithm (STA) constitute the control logic that determines the path of the packets. Thus, the control plane in a traditional network is distributed in the switching fabric (network devices).

In an SDN, a controller embodies the control plane and determines how packets (or frames) should flow (or be forwarded) in the network. The controller communicates this information to the network devices, which constitute the data plane, by setting their forwarding tables. This enables centralized configuration and management of a network. As such, the data plane in an SDN may consist of relatively simple packet-forwarding devices with a communications interface to the controller to receive forwarding decisions. In addition to simplifying management of a network, an SDN architecture may also enable monitoring and troubleshooting features that may be beneficial for use in an electric power distribution system, including but not limited to: mirroring a data-selected flow rather than mirroring a port; alarming on bandwidth near saturation; providing metrics (e.g., counters and meters for quality of service, packet counts, errors, drops, or overruns, etc.) for a specified flow;

and/or permitting monitoring of specified applications rather than monitoring based on VLANs or MAC addresses.

An SDN may operates on and control packet sequences by a variety of techniques, including meter entries, flow entries, and group entries. Flow entries define how a switch in the data plane is to handle packets. The flow entry operates on a packet when there is a match between some criteria(s) of the packet and the flow entry's match fields. Meter entries are attached to flow entries and enable ingress rate limiting. Each meter band may specify the rate at which the band will be activated for processing a data flow. Group entries may be utilized to enhance forwarding behavior of the data flows and to apply Quality of Service (QoS) policies to the packet. Group entries contain a list of "action buckets," each of which may detail a set of actions for packets that fall into the action bucket. In connection with various embodiments, the phrase "reverse metering" may be used to describe the concept of using meter bands associated with meter entry attributes to alter forwarding behavior of a data flow. In various embodiments consistent with the present disclosure, the OpenFlow protocol may be utilized to control communication devices in a data plane of a SDN.

A "fast failover group" type is a group type designed to detect and overcome port failures in an SDN. In addition to action buckets, the fast failover group has a watch port and/or a watch group as a parameter that monitors the "liveliness" of the indicated port or group. Only one bucket can be used at a time, and the bucket can only be used if liveness conditions are met The present disclosure enhances the forwarding capabilities of an SDN device by increasing the available options for making failover decisions. Using the systems and methods disclosed herein, a SDN network may be configured to change the forwarding behavior of a packet based on traffic activity instead of, or in addition to making failover decisions based solely on a port link state. In various situations, some of which may involve operator error, traffic may be misdirected, and may not reach its intended destination; however, the port link state may remain "up." By incorporating an analysis of the data traffic associated with a particular data flow, and utilizing such information to control the port link state, the system may both be able to failover based on additional criteria. Detection of a condition in which traffic fails to satisfy a threshold improves reliability in the system by leveraging attributes of an SDN system.

In some embodiments, systems and methods consistent with the present disclosure may define a new flow attribute to be used for condition-based actions. In various embodiments, the new meter behavior may be based on traffic metrics and/or may be based on a watch port in a fast failover group. Accordingly, the forwarding behavior of a communication device may be changed based on the meter value and/or the port link state of a watch port. In one specific embodiment, a threshold value from a meter may be used to specify the port link state of a watch port. In such an embodiment, if the traffic count is less than a specific threshold, then the flow forwarding action may change Alternatively, if the configured count exceeds the configured count, the switch may return to original forwarding behavior Multiple groups within an SDN may use a single watch port as a trigger, even if the watch port is associated with another device. This may enable data flows to influence themselves or other flows through the SDN or through the same switch. In some embodiments, changes to data flows based on a reverse meter may be automatically reversed once a network burden meets one or more thresholds. In other embodiments, the changes to the flows may remain in in effect until reset by a network administrator.

Systems and methods disclosed herein may utilize various features available in an SDN to monitor physical and/or logical communication links in the network and to take action based on physical changes (e.g., disconnection of a physical link) or logical changes (e.g., a change in routing) that result in changes to a data flow. As the term is used here, a logical communication link refers to a data communication channel between two or more communicating hosts in a network. A logical communication link may encompass any number of physical links and forwarding elements used to make a connection between the communicating hosts. The physical links and forwarding elements used to create a specific communication path embodying a logical communication link may be adjusted and changed based on conditions in the network. For example, where an element in a specific communication path fails (e.g., a communication link fails or a forwarding device fails), a failover path may be activated so that the logical communication link is maintained. Information may be gathered by monitoring the physical and/or logical communication link to identify and associate information that may be utilized to assess a likelihood of a failure, to generate information about the precursors to a failure, and to identify the root cause of a failure. Such information may then be used to generate reliable failover paths for data flows within the SDN.

Embodiments consistent with the present disclosure may be utilized in a variety of communication devices. A communication device, as the term is used herein, is any device that is capable of accepting and forwarding data traffic in a data communication network. In addition to the functionality of accepting and forwarding data traffic, communication devices may also perform a wide variety of other functions and may range from simple to complex devices.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product, including a non-transitory computer and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of machine-readable media suitable for storing electronic and/or processor-executable instructions.

Figure 1:
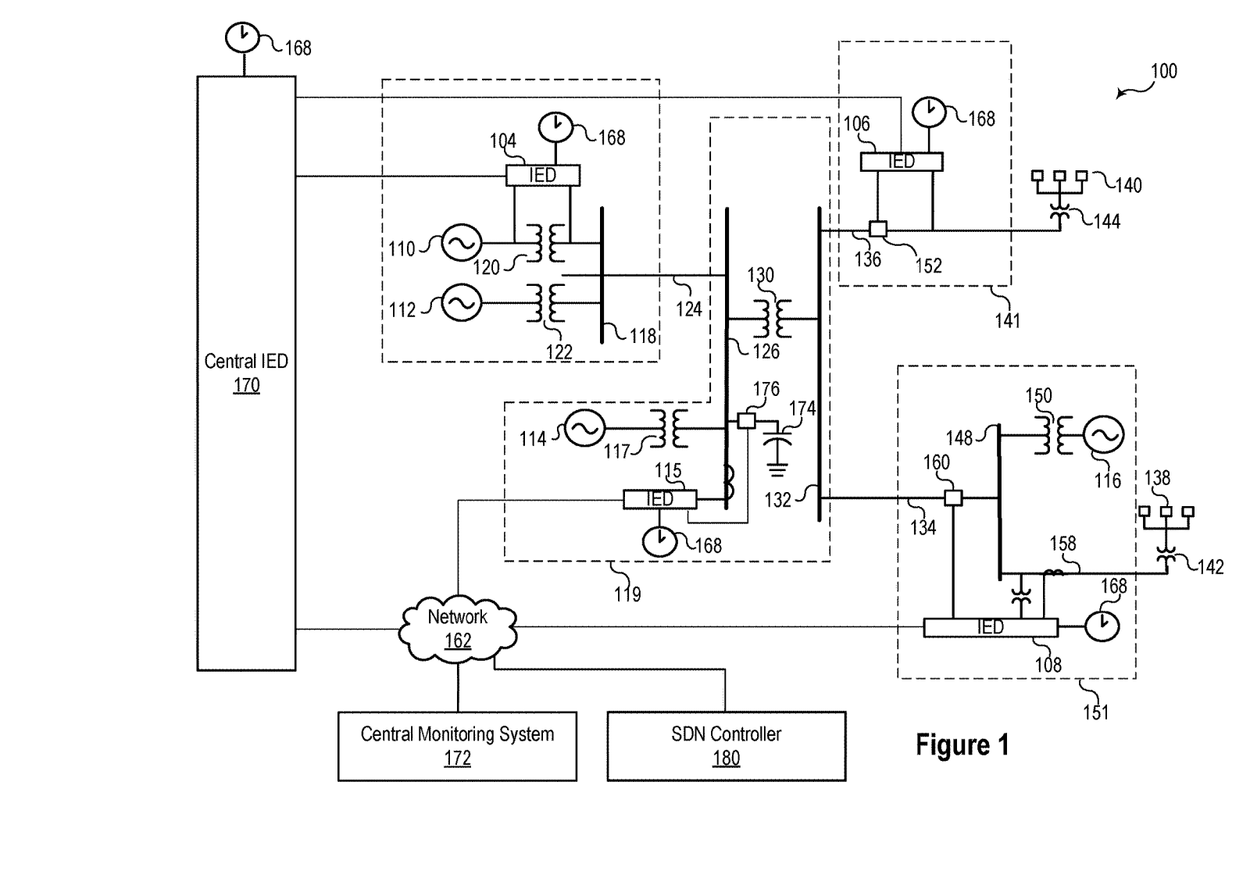
FIG. 1 illustrates a simplified one-line diagram of an electric power transmission and distribution system in which a plurality of communication devices may facilitate communication in an SDN consistent with embodiments of the present disclosure.

FIG. 1 illustrates an example of an embodiment of a simplified one-line diagram of an electric power transmission and distribution system 100 in which a plurality of communication devices may facilitate communication in a SDN consistent with embodiments of the present disclosure. Electric power delivery system 100 may be configured to generate, transmit, and distribute electric energy to loads. Electric power delivery systems may include equipment, such as electric generators (e.g., generators 110, 112, 114, and 116), power transformers (e.g., transformers 117, 120, 122, 130, 142, 144 and 150), power transmission and delivery lines (e.g., lines 124, 134, and 158), circuit breakers (e.g., breakers 152, 160, 176), busses (e.g., busses 118, 126, 132, and 148), loads (e.g., loads 140, and 138) and the like. A variety of other types of equipment may also be included in electric power delivery system 100, such as voltage regulators, capacitor banks, and a variety of other types of equipment.

Substation 119 may include a generator 114, which may be a distributed generator, and which may be connected to bus 126 through step-up transformer 117. Bus 126 may be connected to a distribution bus 132 via a step-down transformer 130. Various distribution lines 136 and 134 may be connected to distribution bus 132. Distribution line 136 may lead to substation 141 where the line is monitored and/or controlled using IED 106, which may selectively open and close breaker 152. Load 140 may be fed from distribution line 136. Further, step-down transformer 144 in communication with distribution bus 132 via distribution line 136 may be used to step down a voltage for consumption by load 140.

Distribution line 134 may lead to substation 151, and deliver electric power to bus 148. Bus 148 may also receive electric power from distributed generator 116 via transformer 150. Distribution line 158 may deliver electric power from bus 148 to load 138, and may include further step-down transformer 142. Circuit breaker 160 may be used to selectively connect bus 148 to distribution line 134. IED 108 may be used to monitor and/or control circuit breaker 160 as well as distribution line 158.

Electric power delivery system 100 may be monitored, controlled, automated, and/or protected using intelligent electronic devices (IEDs), such as IEDs 104, 106, 108, 115, and 170, and a central monitoring system 172. In general, IEDs in an electric power generation and transmission system may be used for protection, control, automation, and/or monitoring of equipment in the system. For example, IEDs may be used to monitor equipment of many types, including electric transmission lines, electric distribution lines, current transformers, busses, switches, circuit breakers, reclosers, transformers, autotransformers, tap changers, voltage regulators, capacitor banks, generators, motors, pumps, compressors, valves, and a variety of other types of monitored equipment.

As used herein, an IED (such as IEDs 104, 106, 108, 115, and 170) may refer to any microprocessor-based device that monitors, controls, automates, and/or protects monitored equipment within system 100. Such devices may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communications processors, computing platforms, programmable logic controllers (PLCs), programmable automation controllers, input and output modules, and the like. The term IED may be used to describe an individual IED or a system comprising multiple IEDs.

A common time signal may be distributed throughout system 100. Utilizing a common or universal time source may ensure that IEDs have a synchronized time signal that can be used to generate time synchronized data, such as synchrophasors. In various embodiments, IEDs 104, 106, 108, 115, and 170 may receive a common time signal 168. The time signal may be distributed in system 100 using a communications network 162 or using a common time source, such as a Global Navigation Satellite System ("GNSS"), or the like.

According to various embodiments, central monitoring system 172 may comprise one or more of a variety of types of systems. For example, central monitoring system 172 may include a supervisory control and data acquisition (SCADA) system and/or a wide area control and situational awareness (WACSA) system. A central IED 170 may be in communication with IEDs 104, 106, 108, and 115. IEDs 104, 106, 108 and 115 may be remote from the central IED 170, and may communicate over various media such as a direct communication from IED 106 or over a wide-area communications network 162. According to various embodiments, certain IEDs may be in direct communication with other IEDs (e.g., IED 104 is in direct communication with central IED 170) or may be in communication via a communication network 162 (e.g., IED 108 is in communication with central IED 170 via communication network 162).

Communication via network 162 may be facilitated by networking devices including, but not limited to, multiplexers, routers, hubs, gateways, firewalls, and switches. In some embodiments, IEDs and network devices may comprise physically distinct devices. In other embodiments, IEDs and network devices may be composite devices, or may be configured in a variety of ways to perform overlapping functions. IEDs and network devices may comprise multi-function hardware (e.g., processors, computer-readable storage media, communications interfaces, etc.) that can be utilized in order to perform a variety of tasks that pertain to network communications and/or to operation of equipment within system 100.

An SDN controller 180 may be configured to interface with equipment in network 162 to create an SDN that facilitates communication between IEDs 170, 115, 108, and monitoring system 172. In various embodiments, SDN controller 180 may be configured to interface with a control plane (not shown) in network 162. Using the control plane, controller 180 may be configured to direct the flow of data within network 162.

SDN controller 180 may be configured to receive information from a plurality of devices in network 162 regarding transmission of data. In embodiments in which network 162 includes fiber optic communication links, the data collected by the SDN controller 180 may include traffic metrics, such as packet counts, packet loss, latency, transmission times, port link state, etc. SDN controller 180 may implement various techniques disclosed herein to ensure reliable transmission of data during periods of network congestion and other conditions that may interrupt one or more logical communications links between communicating hosts.

Figure 2A:
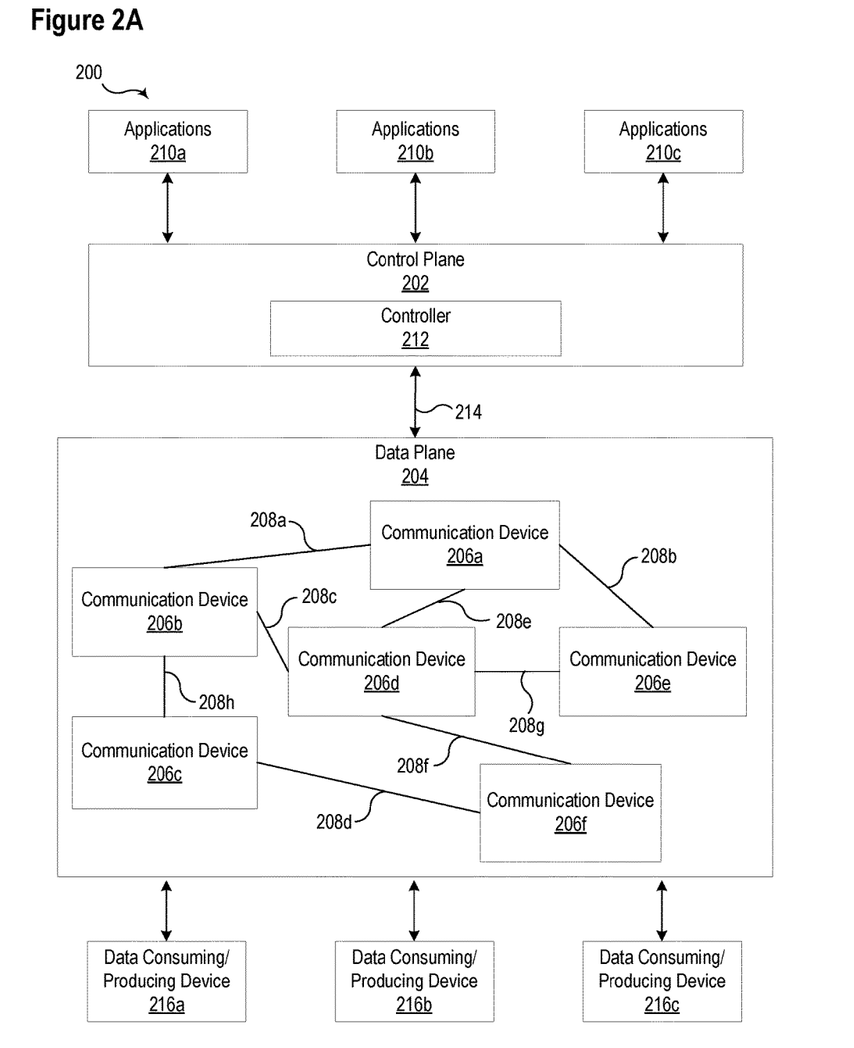
FIG. 2A illustrates a conceptual representation of an SDN including a control plane, a data plane, and a plurality of data-consuming and data-producing devices that may be deployed in an electric power transmission and distribution system consistent with embodiments of the present disclosure.

FIG. 2A illustrates a conceptual representation of a SDN 200 including a control plane 202, a data plane 204, and a plurality of data-consuming and a plurality of data-producing devices 216a-c that may be deployed in an electric power transmission and distribution system consistent with embodiments of the present disclosure. The control plane 202 directs the flow of data through the data plane 204. More specifically, a controller 212 may communicate with the plurality of communication devices 206a-206f via an interface 214 to establish data flows. The controller 212 may specify rules for routing traffic through the data plane 204 based on a variety of criteria. In some embodiments, applications 210a-210c may be used to configure the control plane 202.

As illustrated, the data plane 204 includes a plurality of communication devices 206a-206f in communication with one another via a plurality of physical links 208a-208h. In various embodiments, the communication devices 206a-206f may be embodied as switches, multiplexers, and other types of communication devices. The physical links 208a-208h may be embodied as Ethernet, fiber optic, and other forms of data communication channels. As illustrated, the physical links 208a-208h between the communication devices 206a-206f may provide redundant connections such that a failure of one of the physical links 208a-208h is incapable of completely blocking communication with an affected communication device. In some embodiments, the physical links 208a-208h may provide an N–1 redundancy or better.

The data consuming/producing devices 216a-c may represent a variety of devices within an electric power transmission and distribution system that produce or consume data. For example, data consuming/producing devices may, for example, be embodied as a pair of transmission line relays configured to monitor an electrical transmission line. The transmission line relays may monitor various aspects of the electric power flowing through the transmission line (e.g., voltage measurements, current measurements, phase measurements, synchrophasers, etc.) and may communicate the measurements to implement a protection strategy for the transmission line. Traffic between the transmission line relays may be forwarded through the data plane 204 using a plurality of data flows implemented by controller 212. Of course, data consuming/producing devices 216a-c may be embodied by a wide range of devices consistent with embodiments of the present disclosure.

The plurality of communication devices 206a-206f may each include a trust/encryption subsystem that secure communications among devices in the data plane 204. In various embodiments, the trust/encryption subsystem may be issued one or more certificates by controller 212. The one or more certificates may be used to encrypt data traffic sent or received by a particular device. Further, the trust/encryption subsystem may be configured to verify the identity of a sender of SDN data.

When data is received from data consuming/producing device 216a, the encryption subsystem of one of the plurality of communication devices 206a-206f may encrypt the data before forwarding the data on to another communication device. The final communication device to receive the data prior to transmission to data consuming/producing device 216c may decrypt the data. Accordingly, the encryption and decryption of the data transmitted between data consuming/producing devices 216a and 216c may be transparent to the devices. In other words, the entire encryption and decryption process of the selected data flow may be performed by the plurality of communication devices 206a-206f without involving data consuming/producing devices 216a-c. In various embodiments, the systems and methods disclosed herein may be used to implement end-to-end encryption between a data producing device and a data consuming device that lack encryption capabilities.

Figure 2B:
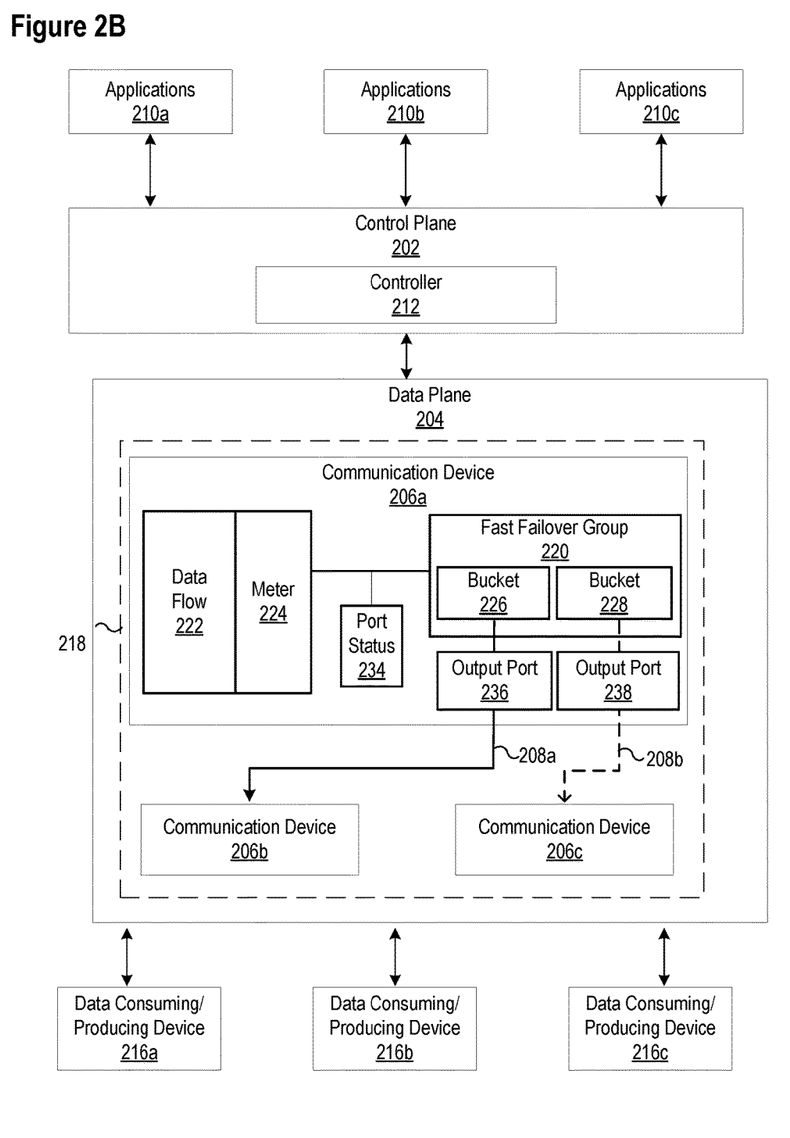
FIG. 2B illustrates a conceptual representation of the SDN system of FIG. 2A configured to redirect a data flow based on a reverse metering threshold consistent with embodiments of the present disclosure.

FIG. 2B illustrates a conceptual representation of the SDN system of FIG. 2A configured to redirect a data flow based on a reverse metering threshold consistent with embodiments of the present disclosure. A data flow 218 in data plane 204 may be configured to operate in conjunction with fast failover group entries 220. Fast failover group entries 220 may comprise a plurality of buckets, such as buckets 226 and 228. Ingress packets (not shown) may match a criterion specified by data flow 222 and may be counted by meter 224. The meter 224 may be configured to determine whether the number of ingress packets is greater than a threshold. In various embodiments, if meter 224 is less than a specified value, a port link state 234 may be set to "up." If meter 224 is greater than the specified value, the port link state 234 may be set to "down." Fast failover group 220 may switch between bucket 226 and bucket 228 based on the port link state 234. If the port link state 234 is "up," bucket 226 may be active, and if the port link state 236 is "down," bucket 228 may be active.

As illustrated, bucket 226 may forward egress traffic associated with data flow 222 through output port 236, while bucket 228 may forward egress traffic through output port 238. The traffic may be directed to different physical links and different communication devices to reduce network congestion and data packet loss. In the illustrated embodiment, output port 236 may be associated with physical link 208a and may direct the traffic associated with data flow 222 to communication device 206b. Output port 238 may be associated with physical link 208b and may be associated with physical link 208b and may direct the traffic associated with data flow 222 to communication device 206c. In various embodiments the implementation of the logic in bucket 226 and bucket 228 may be implemented using the IEC 61850-9-2 standard.

Figure 3:
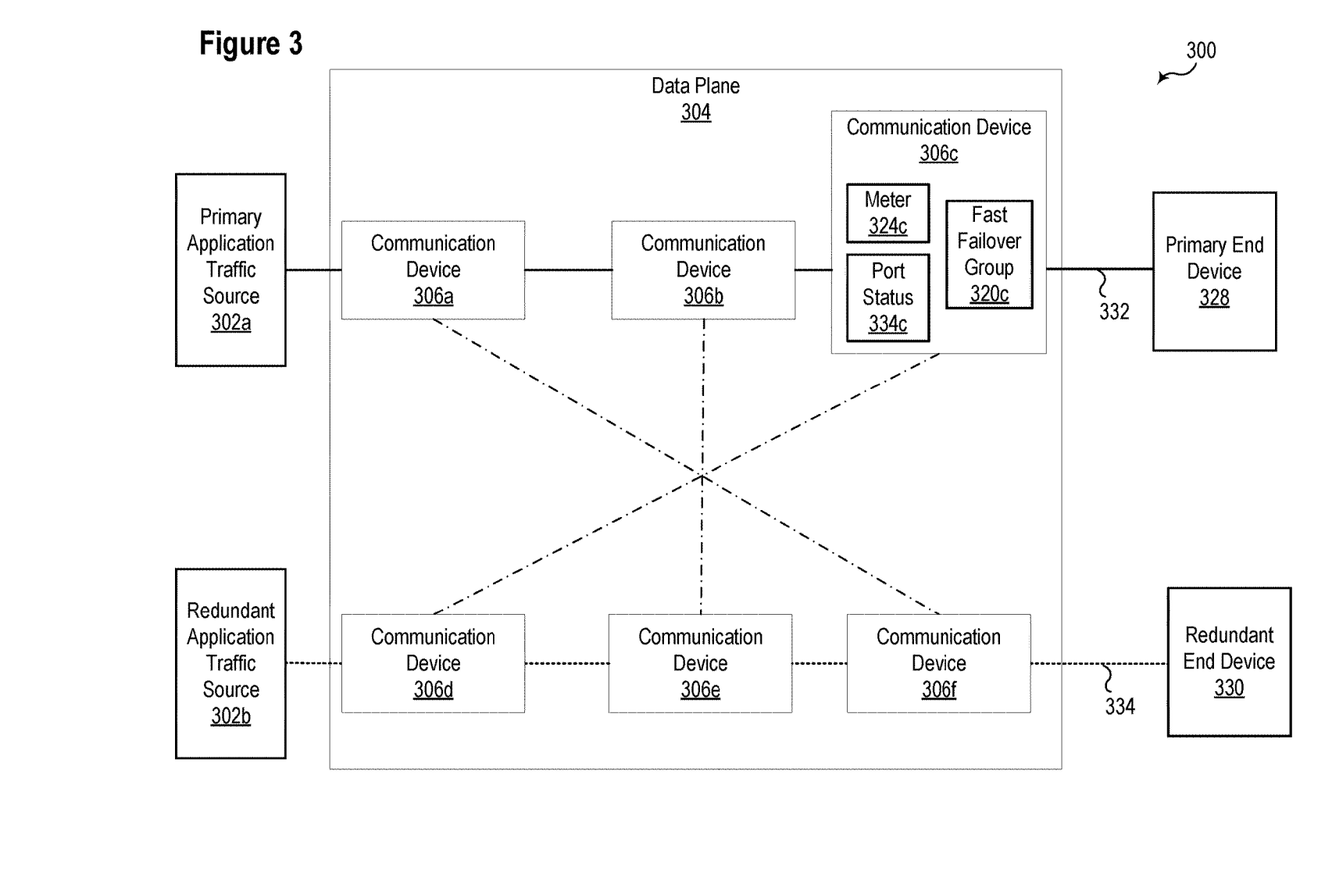
FIG. 3 illustrates a conceptual representation of a system configured to implement a redundant communication path that may be adapted based on an analysis of traffic flows consistent with embodiments of the present disclosure.

FIG. 3 illustrates a conceptual representation of a system 300 configured to implement a redundant communication path that may be adapted based on an analysis of traffic flows consistent with embodiments of the present disclosure. System 300 includes a primary application traffic source 302*a* and a redundant application traffic source 302*b*. Redundancies may be in a variety of infrastructure systems, including electric power systems, to help to ensure that important data is successfully transmitted. In the illustrated embodiment, a data plane 304 includes a plurality of communication devices 306*a-f*. Each of communication devices 306*a-f* is in communication with two other communication devices.

Redundant traffic flows may be configured to be forwarded through physically distinct communication devices and communication links to avoid a single point of failure. For example, a primary traffic flow between primary application traffic source 302*a* and primary end device 328 may be forwarded through communication devices 306*a*, 306*b*, and 306*c*, as shown by a solid line in FIG. 3. The redundant traffic between redundant application traffic source 302*b* and redundant end device 330 may be forwarded through communication devices 306*d*, 306*e*, and 306*f*, as shown by a dotted line in FIG. 3. Additional physical communication links between the communication devices 306*a*-306*f* are shown using a dash-dot line pattern.

System 300 may be configured to utilize the techniques disclosed in the present application to analyze data flows and traffic metrics and adapt the redundant traffic forwarding behavior based on such analysis to reduce utilization of network resources while maintaining a high level of reliability. Although use of redundant data streams may increase the likelihood that at least one of the data streams is received, the redundant traffic consumes resources, and may only be required relatively infrequently (e.g., upon the failure of one or more communication devices or communication links).

In the illustrated embodiment, communication devices 306*a-f* may comprise various components for monitoring traffic flows and statuses. More specifically, communication device 306*c* is illustrated as comprising a fast failover group 320*c*, a meter 324*c*, and a port link state 334*c*. In various embodiments, meter 324*c* may be used to set a port link state 334*c*. In the illustrated embodiment, meter 324*c* may ensure that the flow of traffic from primary application traffic source 302*a* to primary end device 328 is maintained above a threshold. While the traffic is maintained above the threshold, the redundant traffic may be suppressed or selectively discarded.

A decrease in the traffic flow below a threshold, as determined by meter 324*c*, may be indicative of a disruption in the data in the primary data flow. Accordingly, the port link state 334*c* may be changed. The change in the port link state 334*c* may trigger a fast failover group 320*c*, which may implement actions to respond to the disruption in the primary data flow.

Upon detection of a disruption in the primary data flow (i.e., upon a change in the port link state 334*c*), the redundant data flow between redundant application traffic source 302*b* and redundant end device 330 may be enabled. The redundant data flow may utilize communication devices 306*d*, 306*e*, and 306*f* and the associated communication links between such devices. In an alternative embodiment, a timer on a fixed countdown may be reset each time a packet matches an expected data flow. The time out may be adjusted to accommodate the longest duration that would be expected between two data packets associated with a data flow. Upon expiration of the timer, the port link state 334*c* may be changed.

The configuration shown in FIG. 3, in which a redundant path is activated when meter 324*c* falls below a specified threshold, may allow system 300 to avoid continuous transmission of a redundant data stream, while still realizing many of the benefits associated with a redundant system. In some embodiments, the failover performance based on a change in the port link state 334*c* may be on the order of microseconds. This short failover period minimizes the loss of application traffic.

Moreover, such a system may also enhance situational awareness to the network operators. In current network configurations, network operators may be able to monitor the network burden and may receive notifications when a network becomes overburdened. The system illustrated in FIG. 3 may enable monitoring based on the change in port link state 334*c*. This utilization may be useful for networks controlling electric power systems, as well as a variety of other networks, such as SCADA, phasor-measurement units, telecommunications video applications, etc.

Figure 4:
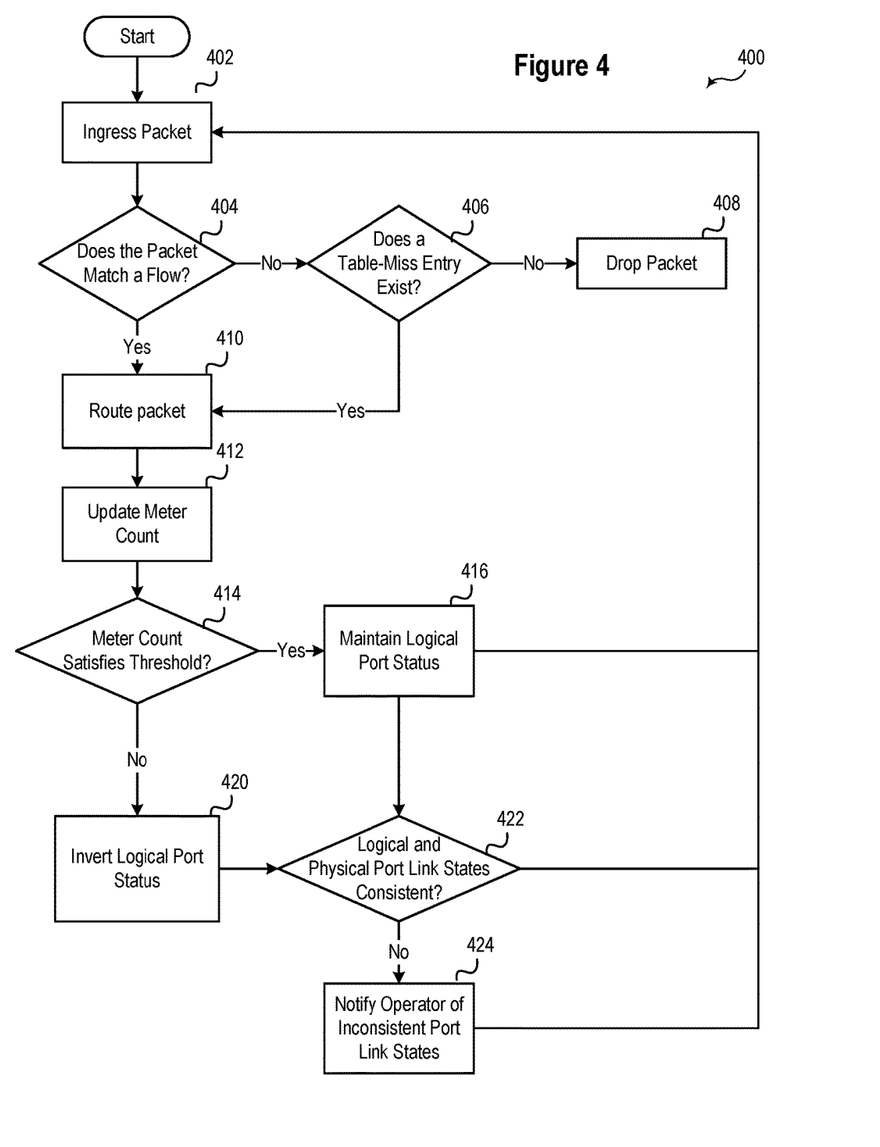
FIG. 4 illustrates a flowchart of a method for processing an information packet in a SDN consistent with the embodiments in the present disclosure.

FIG. 4 illustrates a flowchart of a method 400 for processing an information packet in a SDN consistent with the embodiments in the present disclosure. At 402, an ingress packet may be received. At 404, method 400 may determine if the packet matches any existing data flows. If the packet does not match any flow IDs, it may then be determined if a there is a table for packets without a matching flow (i.e., a table-miss entry), at 406. If there is no table-miss entry, the packet is dropped at 408. At 410, the packet may be forwarded based on the flow of the table-miss entry. A meter for the associated flows may be updated at 412.

At 414, method 400 may determine whether the meter count satisfies a threshold. In some embodiments, the meter count may be used to determine a packet rate (e.g., 100 packets per second), and the threshold may constitute a packet rate. If the threshold is satisfied, a logical port link state may be maintained at 416. Alternatively, if the threshold is not satisfied, the logical port link state may be inverted at 420 and can be based on receiving a packet or the packet must match a specified flow. For example, if the logical port link state was "up," the logical port link state may be updated to "down." In some embodiments, the logical port link state may be represented as a Boolean value, and the result may be the logical negation of the prior logical port link state.

At 422, method 400 may determine if the local and physical port link states are consistent. In various embodiments, the physical port state may be based on whether a communication device detects an electrical connection to another device through a physical communication link. The logical port state may be based on whether the meter count at 414 satisfies the threshold. In some situations, the physical status may remain "up," but the meter count may be below the threshold, and as such, the physical port link state may differ from the logical port link state. In some embodiments, the logical port status and the physical port status may be subjected to the logical AND operation to identify inconsistencies in the state and/or to change forwarding behaviors.

At 424, an operator may be notified of an inconsistency in the port link state. In various embodiments, notifications may be provided in a variety of ways, such as an email, an event report, etc.

Figure 5:
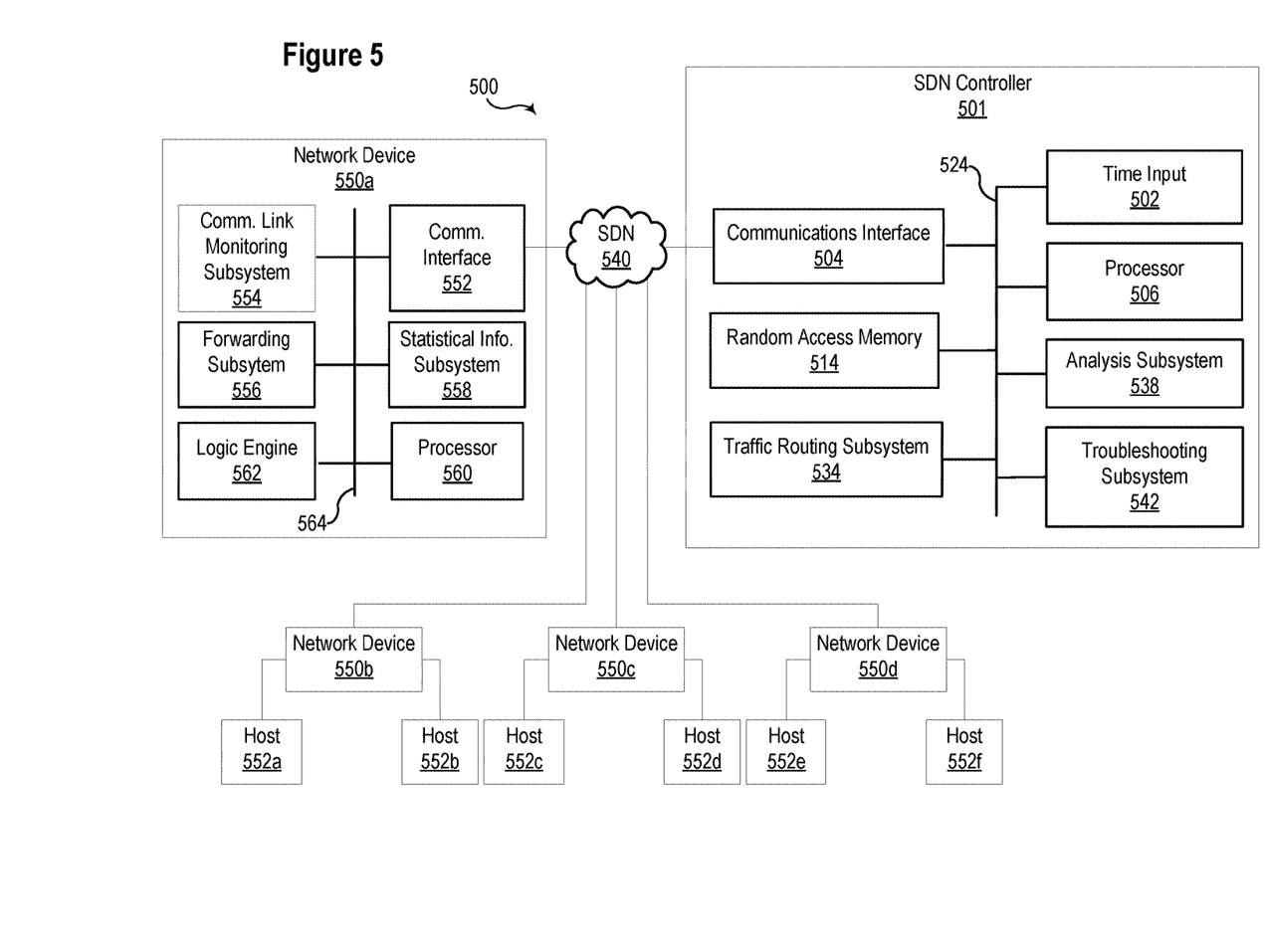
FIG. 5 illustrates a block diagram of a system including an SDN controller, a SDN, and a plurality of communication devices consistent with embodiments of the present disclosure.

FIG. 5 illustrates a block diagram of a system 500 including an SDN controller 501, an SDN 540, and a plurality of communication devices 550a-d consistent with embodiments of the present disclosure. In some embodiments, system 500 may be implemented using hardware, software, firmware, and/or any combination thereof. Moreover, certain components or functions described herein may be associated with other devices or performed by other devices. The specifically illustrated configuration is merely representative of one embodiment consistent with the present disclosure.

SDN controller 501 includes a communications interface 504 configured to communicate with SDN 540 and communication devices 550a-d. Communications interface 504 may facilitate communications with multiple devices. SDN Controller 501 may further include a time input 502, which may be used to receive a time signal (e.g., a common time reference) allowing SDN controller 501 to apply a timestamp received data. In certain embodiments, a common time reference may be received via communications interface 504, and accordingly, a separate time input may not be required. One such embodiment may employ the IEEE 1588 protocol. A data bus 524 may facilitate communication among various components of SDN controller 501.

Processor 506 may be configured to process communications received via communications interface 504 and time input 502 and to coordinate the operation of the other components of SDN Controller 501. Processor 506 may operate using any number of processing rates and architectures. Processor 506 may be configured to perform any of the various algorithms and calculations described herein. Processor 506 may be embodied as a general-purpose integrated circuit, an application-specific integrated circuit, a field-programmable gate array, and/or any other suitable programmable logic device.

Instructions to be executed by processor 506 may be stored in random access memory 514 (RAM). Such instructions may include information for processing routing and processing data packets received via communications interface 504 based on a plurality of traffic flows.

An analysis subsystem 538 may be configured to analyze data relating to traffic transmitted via SDN 540. The data transmitted across SDN 540, communication network devices 550a-d, and hosts 552a-552f in an open mode may be monitored and analyzed to identify a plurality of communication flows within the network 162. In various embodiments, communication network devices 550a-d may collect information, such as meter counts, about the data transmitted across SDN 540. The data collected by communication network devices 550a-d relating to traffic on the network may be provided to analysis subsystem 538. In some embodiments, analysis subsystem 538 may be configured to determine whether a particular data flow falls within one or more meter bands for purposes of determining the "liveness" of a port.

Traffic routing subsystem 534 may be configured to generate a variety of communication flows in SDN 540 based on information received from the analysis subsystem 538 and/or the user interface module. The traffic routing subsystem 534 may specify the configuration of a variety of intermediate devices (e.g., routers, switches, multiplexers, etc.), separating communicating hosts. In one example, the traffic routing subsystem 534 may be configured to generate physically distinct paths through which redundant information flows may be transmitted, as described above in connection with FIG. 3.

A troubleshooting subsystem 542 may be configured to aid in identifying configuration problems in system 500 and identifying possible solutions. For example, troubleshooting subsystem 542 may be active where a physical port link status indicates that a port is "up," but where traffic is not reaching the port, and accordingly, the logical port link status may indicate that the port is "down."

Network device 550a is illustrated in greater detail than the other communication devices 550b-550c, however, communication devices 550b-550d may include some or all of the illustrated features and elements. Each of the communication devices 550a-550d may include a communication interface 552, a communication link monitoring subsystem 554, a forwarding subsystem 556, a statistical information subsystem 558, a processor 560, and a logic engine 562. The components of network device 550a may be in communication via a bus 564. The communication interface 552 may facilitate communications with multiple devices. In various embodiments, the communication interface 552 may be configured to communicate via a variety of communication links, including Ethernet, fiber optic, and other forms of data communication channels.

The communication link monitoring subsystem 554 may be configured to monitor communications received or transmitted by network device 550a. In some embodiments, the communication link monitoring subsystem 554 may determine a deviation from normal parameters, monitor packet loss, monitor latency, count data packets associated with particular data flows, and monitor other metrics relating to data transmission. The communication link monitoring subsystem 554 may be configured to determine whether traffic associated with a particular data flow is within expected ranges (e.g., satisfies established thresholds or falls within specified meter bands). Such information may be communicated to the SDN controller 501.

The forwarding subsystem 556 may be configured to track the connection of devices and routing of data through network device 550a. In some embodiments, the routing information subsystem 556 may include an address table, a routing information base, a forwarding table, etc. The forwarding subsystem 556 may be configured to provide information to analysis subsystem 538 about data transmitted by network device 550a that may be utilized by analysis subsystem 538 to identify and/or reconfigure communication flows involving network device 550a.

The statistical information subsystem 558 may be configured to collect statistics relating to data passing through network device 550a. In some embodiments, such statistics may include a variety of types of information, including packet counts, errors, drops, or overruns, etc. The statistical information subsystem 558 may be configured to provide information to analysis subsystem 538 about data transmitted by network device 550a that may be utilized by analysis subsystem 538 to identify communication flows involving network device 550a.

The processor 560 may be configured to process communications received via communications interface 552 and to coordinate the operation of the other components of network device 550a. Processor 560 may operate using any number of processing rates and architectures. Processor 560 may be configured to perform any of the various algorithms and calculations described herein. Processor 560 may be embodied as a general purpose integrated circuit, an application specific integrated circuit, a field-programmable gate array, and/or any other suitable programmable logic device.

Logic engine 562 may be configure to receive and implement forwarding instructions or other commands. In some embodiments, logic engine 562 may be configured to selectively implement changes associated with a fast failover group and associated action buckets. In various embodiments, logic engine 562 may be configured to utilize the IEC 61850 standard.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system configured to monitor a data flow in a software defined network (SDN), the system comprising:
a communications interface configured to receive a plurality of ingress packets;
a forwarding subsystem configured to:
match a subset of the plurality of ingress packets with the data flow; and
forward the subset of the plurality of ingress packets based on a first instruction set associated with the data flow through a primary communication path;
a statistical information subsystem configured to update a meter count associated with the subset of the plurality of ingress packets matched with the data flow;
a logic engine configured to:
determine that the meter count fails to satisfy a threshold;
change a logical port state based on the failure to satisfy the threshold; and
transition from the first instruction set to a second instruction set that corresponds to a redundant communication path based on the logical port state.

2. The system of claim 1, wherein the first instruction set and the second instruction set comprise a fast failover group.

3. The system of claim 2, wherein the first instruction set comprises a second instruction set.

4. The system of claim 1, wherein the first instruction set corresponds to a primary communication path and the second instruction set corresponds to a redundant communication path.

5. The system of claim 1, wherein the primary communication path and the redundant communication path comprise physically distinct communication links.

6. The system of claim 1, wherein the first instruction set comprises instructions to selectively discard packets forwarded to the redundant communication path and the second instruction set comprises instructions to selectively discard packets forwarded to the primary communication path.

7. The system of claim 1, wherein the threshold comprises one of a meter band and a timer.

8. The system of claim 1, wherein the logic engine is further configured to notify an operator of the change of forwarding behavior based on a failure to satisfy the threshold.

9. The system of claim 1, wherein the logic engine is configured to process instructions based on the IEC 61850-9-2 standard and one of the first instruction set and the second instruction set comprise instructions based on the IEC 61850-9-2 standard.

10. A method of monitoring a data flow in a software defined network (SDN), the method comprising:
receiving a plurality of ingress packets;
matching a subset of the plurality of ingress packets with the data flow;
forwarding the subset of the plurality of ingress packets based on a first instruction set associated with the data flow through a communication path;
updating a meter count associated with the subset of the plurality of ingress packets matched with the data flow;
determining that the meter count fails to satisfy a threshold;
changing a logical port state based on the failure to satisfy the threshold;
transitioning from the first instruction set to a second instruction set that corresponds to a redundant communication path based on the logical port state.

11. The method of claim 10, wherein the first instruction set and the second instruction set comprise a fast failover group.

12. The method of claim 11, wherein the first instruction set comprises a second instruction set.

13. The method of claim 1, wherein the primary communication path and the redundant communication path comprise physically distinct communication links.

14. The method of claim 10, wherein the first instruction set selectively discards packets forwarded to the redundant communication path and the second instruction set selectively discards packets forwarded to the primary communication path.

15. The method of claim 10, wherein the threshold comprises one of a meter band and a timer.

16. The method of claim 10, further comprising notifying an operator of the change of the logical port state.

17. The method of claim 10, wherein the first instruction set and the second instruction set comprise instructions based on the IED 61850-9-2 standard.

18. A system configured to monitor a data flow in a software defined network (SDN), the system comprising:
a communications interface configured to receive a plurality of ingress packets;
a forwarding subsystem configured to:
match a subset of the plurality of ingress packets with the data flow;
mirror the subset of the plurality of ingress packets to create a redundant subset of the plurality of ingress packets;
forward the subset of the plurality of ingress packets to a primary communication path based on a first instruction set; and
forward the redundant subset of the plurality of ingress packets to a redundant communication path based on a second instruction;
a statistical information subsystem configured to update a meter count associated with the subset of the plurality of ingress packets matched with the data flow; and
a logic engine configured to:
determine that the meter count fails to satisfy a threshold; and
transition from the first instruction set to a second instruction set associated with the flow data based on the port link state;
wherein the first instruction set comprises instructions to selectively discard packets forwarded to the redundant communication path and the second instruction set comprises instructions to selectively discard packets forwarded to the primary communication path.

19. The system of claim 18, wherein the primary communication path and the redundant communication path comprise physically distinct communication links.

* * * * *